US 6,637,794 B2

(12) United States Patent
McManus et al.

(10) Patent No.: US 6,637,794 B2
(45) Date of Patent: Oct. 28, 2003

(54) IN-FLOOR FLUSH FLOORS RETRACTABLE ROOM SUPPORT

(75) Inventors: Patrick W. McManus, Osceola, IN (US); Martin P. McManus, Mishawaka, IN (US)

(73) Assignee: VT Holdings II, Inc., Reno, NV (US)

( * ) Notice: Subject to any disclaimer, the term of this patent is extended or adjusted under 35 U.S.C. 154(b) by 0 days.

(21) Appl. No.: 09/995,145

(22) Filed: Nov. 27, 2001

(65) Prior Publication Data

US 2002/0074815 A1 Jun. 20, 2002

Related U.S. Application Data

(60) Provisional application No. 60/292,618, filed on May 22, 2001, provisional application No. 60/253,258, filed on Nov. 27, 2000, and provisional application No. 60/253,259, filed on Nov. 27, 2000.

(51) Int. Cl.[7] ................................................. B60P 3/34
(52) U.S. Cl. ............................ 296/26.01; 296/26.13; 296/26.12
(58) Field of Search ..................... 296/26.01, 26.13, 296/26.14, 26.09, 26.12, 171, 175, 165; 50/67, 64

(56) References Cited

U.S. PATENT DOCUMENTS

| | | | |
|---|---|---|---|
| 1,279,819 A | | 9/1918 | Zingsheim et al. |
| 2,813,747 A | | 11/1957 | Rice, Jr. |
| 2,987,342 A | | 6/1961 | Meaker et al. |
| 4,128,269 A | | 12/1978 | Stewart |
| 4,262,503 A | * | 4/1981 | Kuebler ................. 292/259 R |
| 5,237,782 A | * | 8/1993 | Cooper .................... 296/26.13 |
| 5,295,430 A | | 3/1994 | Dewald, Jr. et al. |
| 5,332,276 A | * | 7/1994 | Blodgett, Jr. ............ 296/26.13 |
| 5,491,933 A | * | 2/1996 | Miller et al. ............. 296/26.13 |
| 5,570,924 A | * | 11/1996 | Few et al. ................ 296/26.13 |
| 5,577,351 A | * | 11/1996 | Dewald et al. ............. 296/171 |
| 5,586,802 A | | 12/1996 | Dewald, Jr. et al. |
| 5,706,612 A | * | 1/1998 | Tillett ........................ 296/171 |
| 5,758,918 A | * | 6/1998 | Schneider et al. ....... 296/26.13 |
| 5,785,373 A | * | 7/1998 | Futrell et al. ............ 296/26.01 |
| 5,787,650 A | * | 8/1998 | Miller et al. ............. 296/26.14 |
| 5,788,306 A | | 8/1998 | DiBiagio et al. |
| 5,791,715 A | * | 8/1998 | Nebel ....................... 296/26.13 |
| 5,800,002 A | | 9/1998 | Tiedge et al. |
| 5,833,296 A | * | 11/1998 | Schneider ................. 296/26.13 |
| 5,894,698 A | | 4/1999 | Dewald, Jr. et al. |
| 5,902,001 A | * | 5/1999 | Schneider ................. 296/26.12 |
| 5,915,774 A | | 6/1999 | Tiedge |
| 5,984,396 A | * | 11/1999 | Schneider ................. 296/26.13 |
| 6,052,952 A | | 4/2000 | Frerichs et al. |
| 6,067,756 A | | 5/2000 | Frerichs et al. |
| 6,108,983 A | | 8/2000 | Dewald, Jr. et al. |
| 6,176,045 B1 | * | 1/2001 | McManus et al. ....... 296/26.13 |
| 6,182,401 B1 | | 2/2001 | McManus et al. |
| 6,202,362 B1 | * | 3/2001 | McManus et al. ....... 296/26.08 |
| 6,227,607 B1 | | 5/2001 | Dewald, Jr. et al. |
| 6,257,638 B1 | * | 7/2001 | Graber ..................... 296/26.01 |
| 6,266,931 B1 | * | 7/2001 | Erickson et al. ......... 296/26.01 |

(List continued on next page.)

Primary Examiner—Kiran Patel
(74) Attorney, Agent, or Firm—Baker & Daniels

(57) ABSTRACT

A recreational vehicle includes a main living area and a slide out room that slides between an extended and retracted position relative to the main living area. At least one extendable support member is mounted within the floor of the main living area, and is connected to the slide out room so that the weight of the slide out room is transferred to the extendable support member as the room slides to the extended position. The extendable support member bends in response to the weight transfer such that the room floor is substantially flush and level with respect to the main living area floor. The extendable support includes an inner support connected to the room and the outer support connected to the vehicle. The shape of the inner support may be such that the end connected to the room drops vertically as the inner support is extended from the outer support.

20 Claims, 17 Drawing Sheets

U.S. PATENT DOCUMENTS 6,415,675 B1 * 7/2002 Schneider et al. ....... 296/26.13
6,428,073 B1 * 8/2002 Blodgett, Jr. ............ 296/26.13
6,454,336 B1 * 9/2002 Nye et al. ................ 296/26.13
2002/0047286 A1 * 4/2002 Nye et al. ................ 296/26.13
2002/0084664 A1 * 7/2002 McManus et al. ....... 296/26.13
2002/0089212 A1 * 7/2002 Garceau et al. ............ 296/165
2002/0093213 A1 * 7/2002 Kreil et al. .............. 296/26.01

* cited by examiner

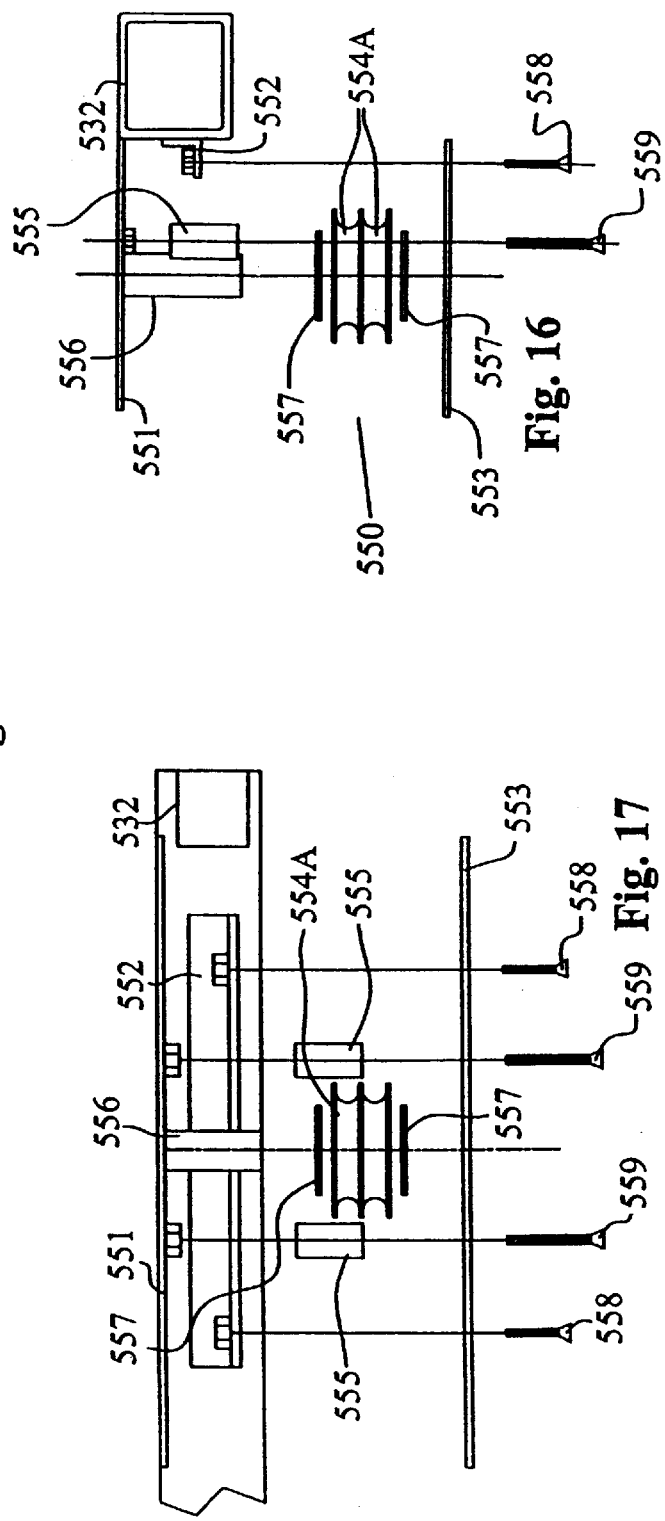
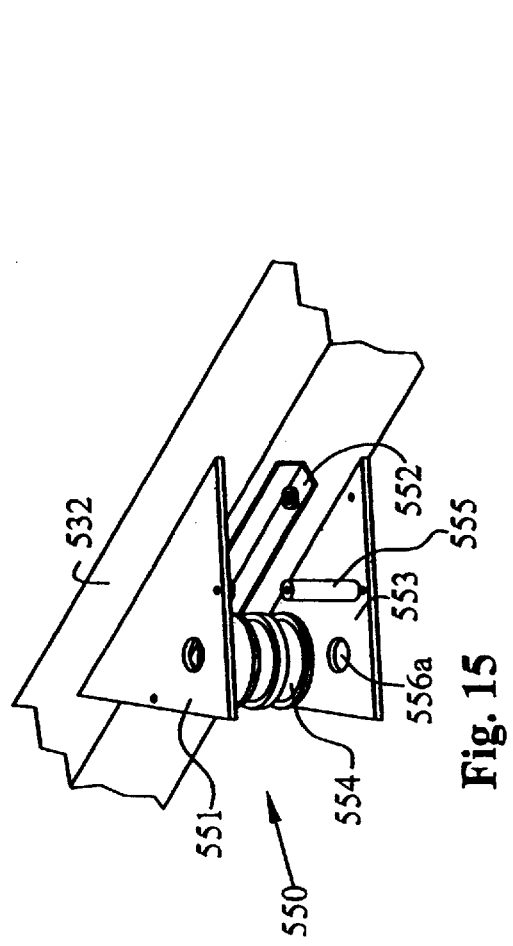
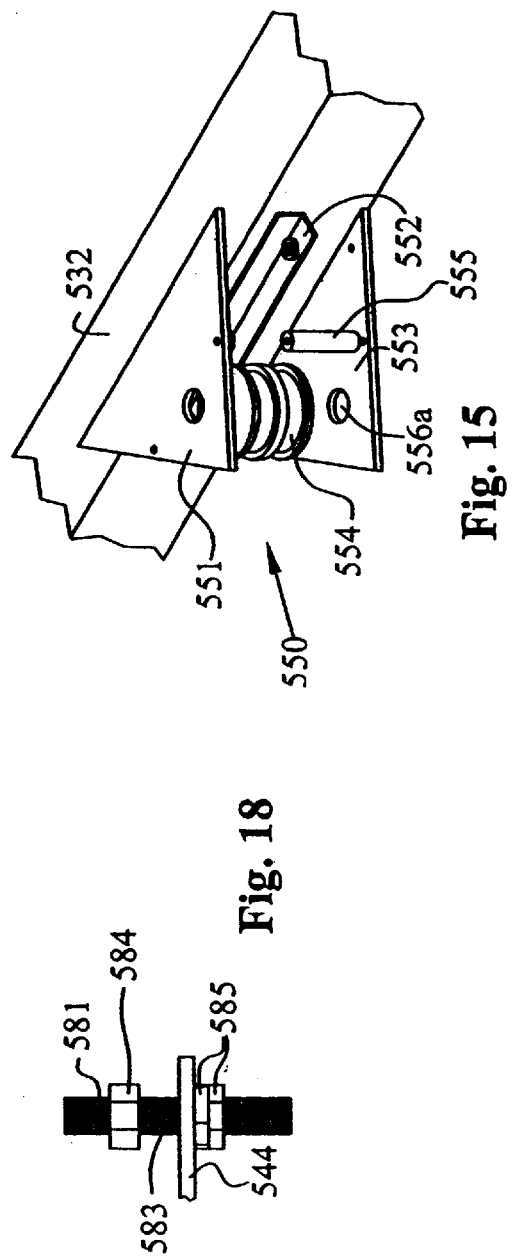
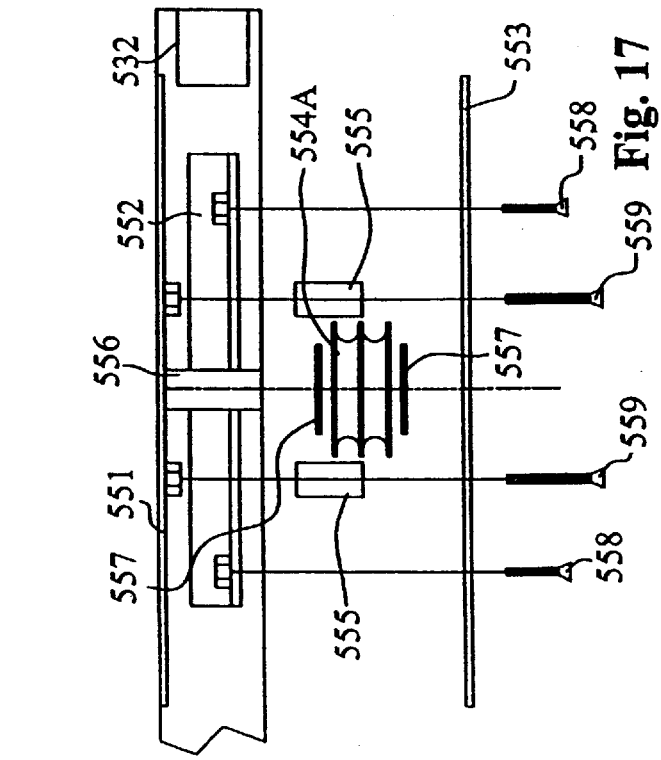

IN-FLOOR FLUSH FLOORS RETRACTABLE ROOM SUPPORT

This application claims the benefit of U.S. Provisional Patent Applications Serial No. 60/253,259 filed Nov. 27, 2000; No. 60/292,618 filed May 22, 2001; and No. 60/253,258 filed Nov. 27, 2000, the complete disclosure of which is hereby expressly incorporated by reference.

FIELD OF THE INVENTION

This invention relates to recreational vehicles or manufactured housing units having a retractable room in which the floor of the retractable room moves to a position flush with the floor of the main living area when the retractable room is extended.

BACKGROUND OF THE INVENTION

The widths of recreational vehicles and manufactured housing units are limited to that which may be accommodated for travel on roads. Accordingly, it is increasingly common to provide recreational vehicles and manufactured housing units with a slide out room that can be retracted into the main living quarters when the unit is being moved or driven, but which can be extended from the main living quarters to provide auxiliary living space when the unit is parked for use or when the manufactured home is assembled at the home site. When the room is retracted into the main living quarters, the floor of the retractable room slides over the floor of the main living quarters and hence the level of the retractable room floor must be above the main floor when the room is retracted. When the room is extended to provide additional living space, most users find a difference in floor levels between the main living quarters and the extended room to be unsatisfactory, and thus it is desirable to provide a mechanism for bringing the room floor flush with the main living quarters floor when the room is extended. Such mechanisms known in the prior art require relatively complicated mechanisms and are relatively costly.

It is also desirable to guide or synchronize the movement of the slide out room so that it does not bind during extension or retraction. Accordingly, recreational vehicle slide out rooms with synchronizing mechanisms have been developed to ensure proper movement of the room as it is extended and retracted. Examples of such slide out rooms are shown in U.S. Pat. No. 5,295,430 and U.S. Pat. No. 2,987,342.

SUMMARY OF THE INVENTION

In one embodiment of the present invention, one or more extendable support members (or inner supports) are housed within channels (or outer supports) in the floor of the main living quarters. Bending of the inner supports which support the slide out room is designed to permit movement of the room such that in the fully extended position, the floor of the slide out room is flush and level with the floor of the main living quarters. Accordingly, the slide out room must necessarily drop to the level of the main floor where the innermost portion of the slide out room rests on top of the supports. The supports are preferably rigidly connected to the slide out room, eliminating the complicated prior art movable linkages. When moved from the extended position, the slide out room is raised by an amount sufficient to place the slide out room floor on top of the floor of the main living quarters which then supports the weight of the slide out room.

According to another embodiment of the present invention, a recreational vehicle includes a slide out room having a synchronizing mechanism. The synchronizing mechanism includes a pair of inner guides, a pair of outer guides, a pair of slide assemblies, a pair of cylinders, a pair of pulley assemblies and a pair of cables. Each slide assembly includes an inner slide member and an outer slide member connected by a bracket. The bracket is connected to the slide out room and to one end of one of the cylinders. The inner slide member moves within one of the inner guides and the outer slide member rides within one of the outer guides. A pair of brackets is connected to the inner slide member to provide connection points for the cables. The inner guides include slots or other openings to accommodate movement of the brackets attached to the inner slide members. In one embodiment, the cylinders are located between the inner and outer guides. Brackets extend from the guides to support one end of each of the cylinders. The pulley assemblies include brackets, double grooved pulleys and bushings. The brackets mount the pulleys to the guide members. The brackets also support the bushings. The cables are connected to the brackets extending from the inner slide members and are threaded around the grooves of the pulleys. The bushings resist displacement of the cables from the grooves in the pulleys. The cables are arranged such that if one end of the slide out room extends or retracts faster than the other end, the cables apply a force to one of the ends to synchronize movement of the ends. The slide out room may also include a mechanism for adjusting the tension in the cables. In other embodiments, the slide out room includes a mechanism for ensuring a proper seal between the slide out room and the main living area of the vehicle when the slide out room is in the extended and retracted positions.

Other features of the present invention will be apparent to those of skill in the art from the following detailed description of the preferred embodiments and the accompanying figures.

BRIEF DESCRIPTION OF THE DRAWINGS

FIGS. 15–17 illustrate pulley assemblies that are components of the extendable support mechanism shown in FIG. 12;

FIG. 18 illustrates an adjustment mechanism for adjusting the tension in the cables that are a component of the extendable support mechanism unit shown in FIG. 12;

DETAILED DESCRIPTION OF EMBODIMENTS OF THE INVENTION

Figure 1:
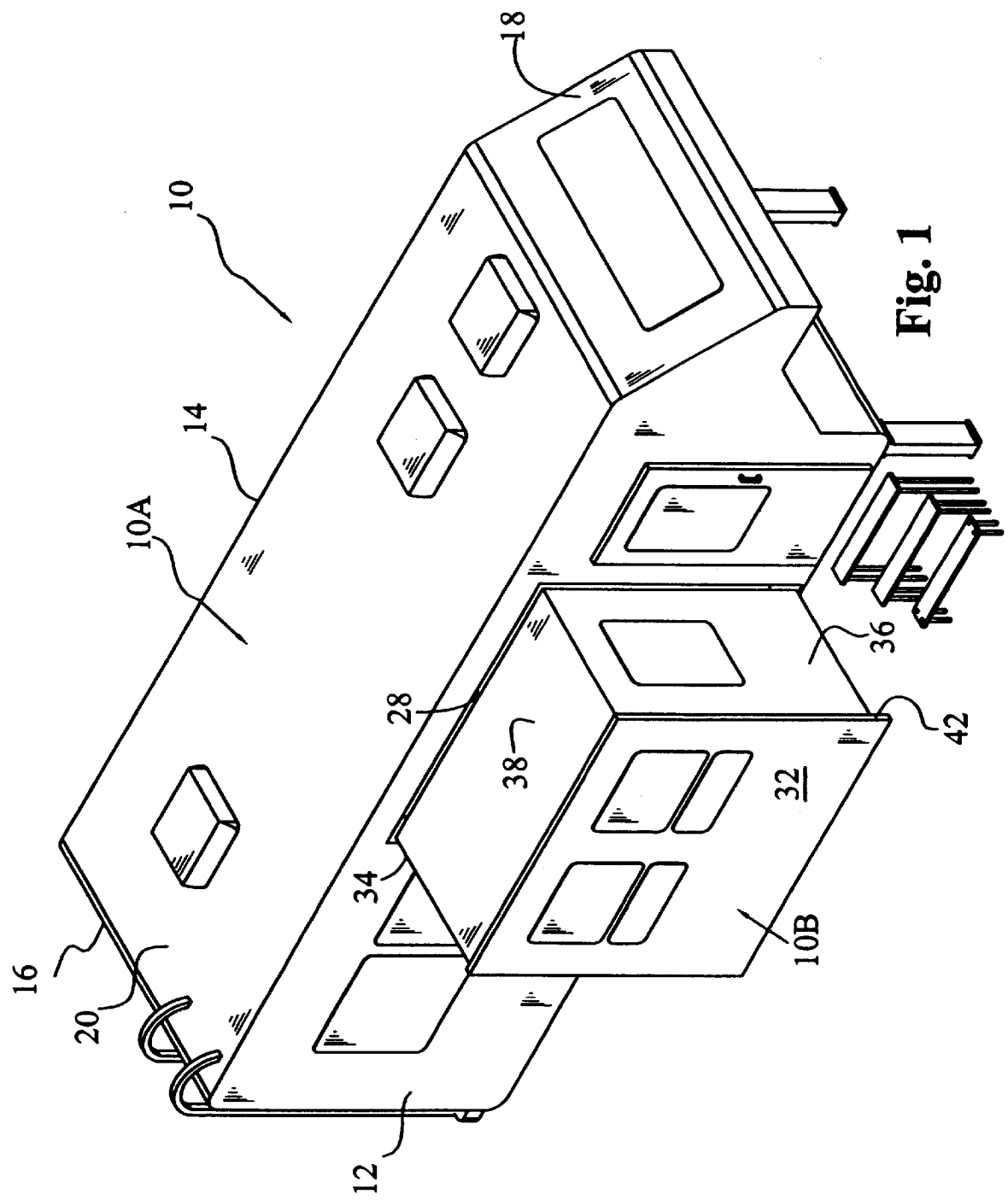
FIG. 1 is a top perspective view of a recreational vehicle having a slide out room in the extended position.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
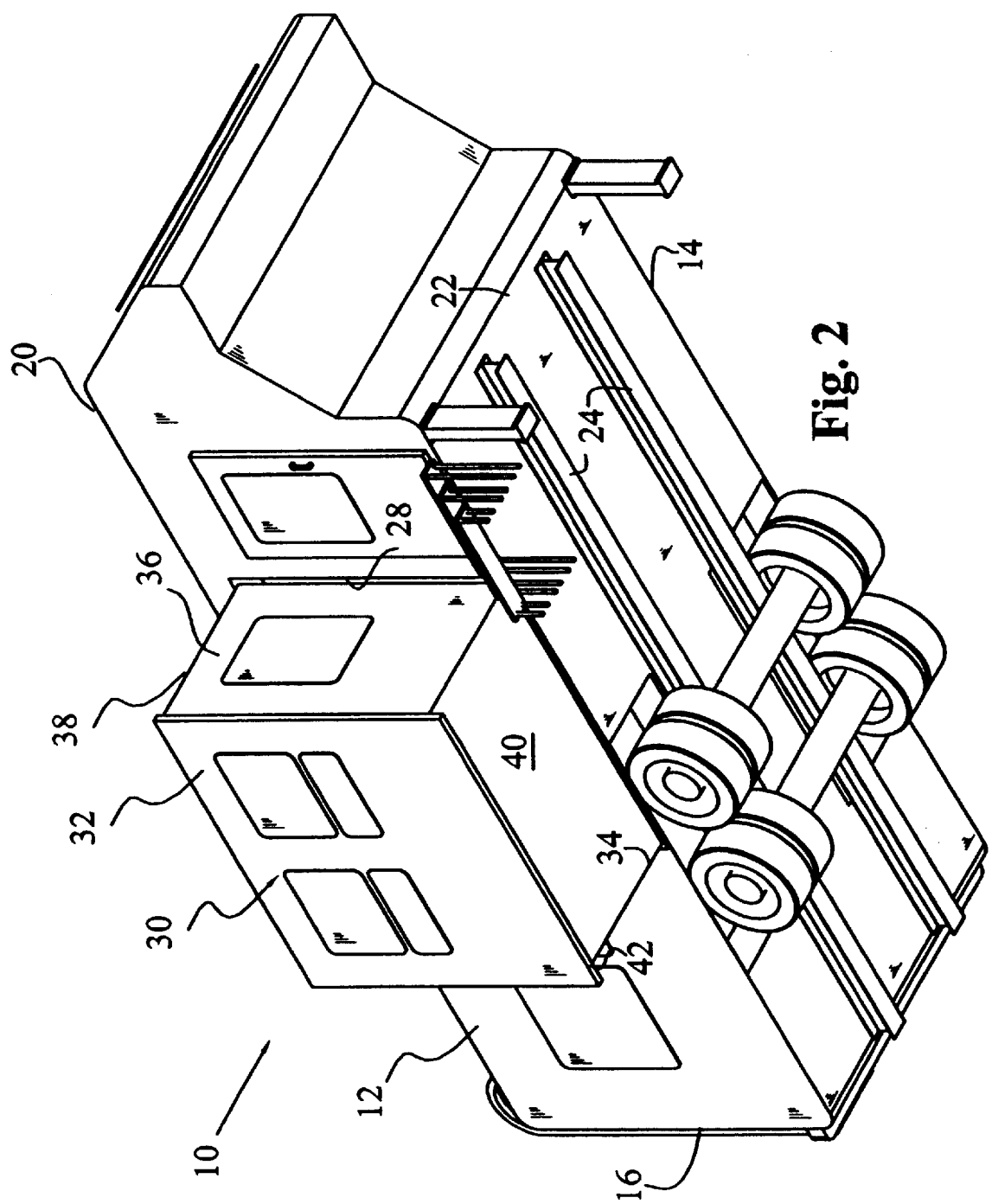
FIG. 2 is a perspective view showing the underside of the recreational vehicle of FIG. 1.
Figure 3:
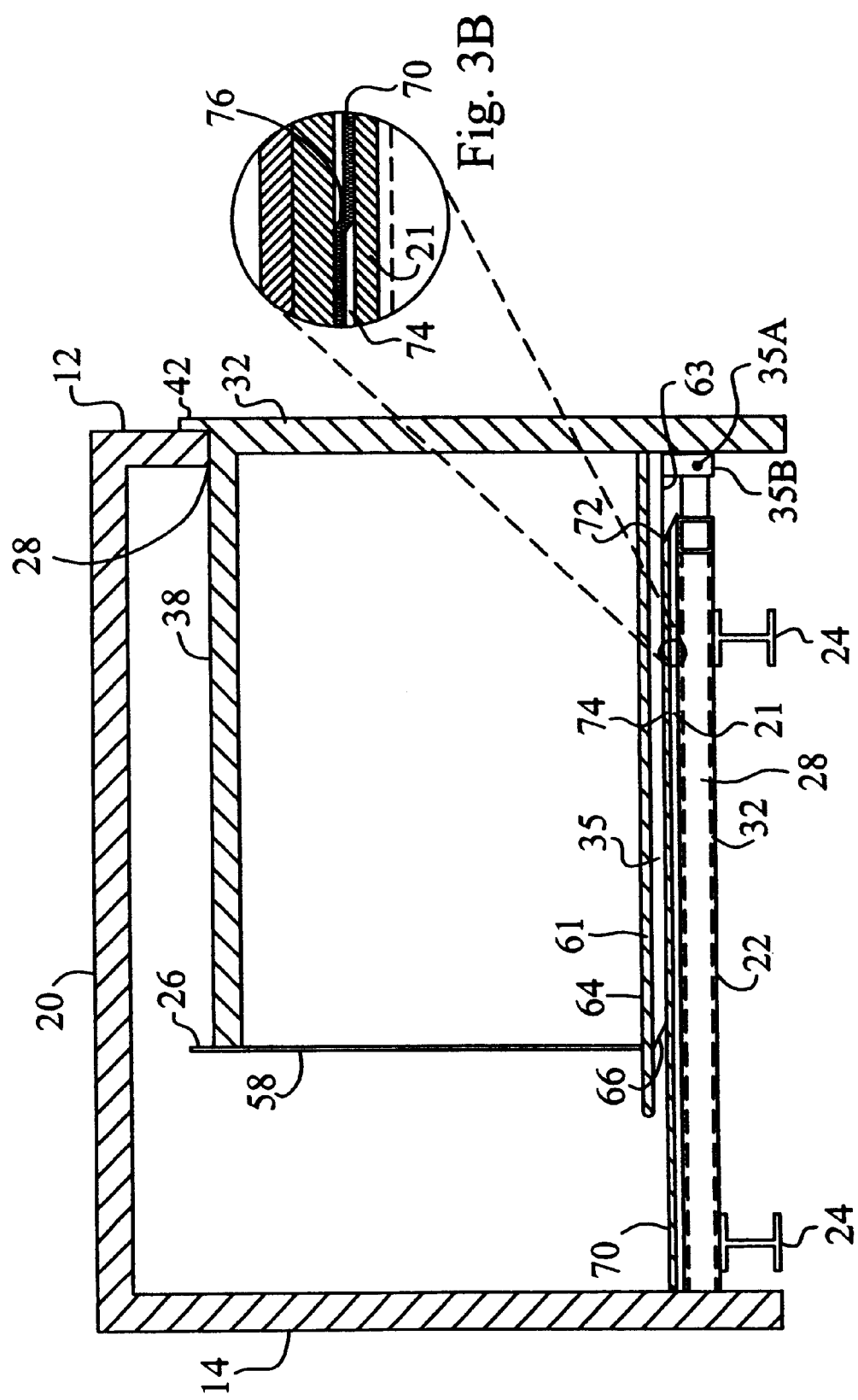
FIG. 3A is a cross-sectional view of a recreational vehicle incorporating a slide out room made pursuant to the teachings of the present invention; shown in the retracted position.
FIG. 3B is a detail insert showing the padding and carpet layers of the main living area floor.

Referring to FIGS. 1 and 2 of the drawings, a mobile living quarters or recreational vehicle generally indicated by the numeral 10, and includes a main living area generally indicated by the numeral 10A and an auxiliary living area or slide out room generally indicated by the numeral 10B. The main living area is defined by side walls 12, 14, end walls 16, 18, ceiling 20, and main floor 22. A pair of conventional, longitudinally extending frame members 24 support the floor 22 of the main living area 10A. Main living area 10A further include an opening 28 through which slide out room 10B extends and retracts. Frame members 24 are supported by conventional wheel and axle assembly to permit vehicle 10 to be moved.

Slide out room 10B includes a pair of sidewalls 34 and 36, a ceiling 38, and a floor 40. Side walls 34 and 36, ceiling 38, and floor 40 define an opening 58 which opens to main living area 10A. Slide out room 10B further includes an outer fascia 42, and an inner fascia (not shown) which allow for sealed conditions when in the fully extended and fully retracted positions, as more fully explained in our pending patent application Ser. No. 09/952,686, incorporated herein by reference.

Figure 4:
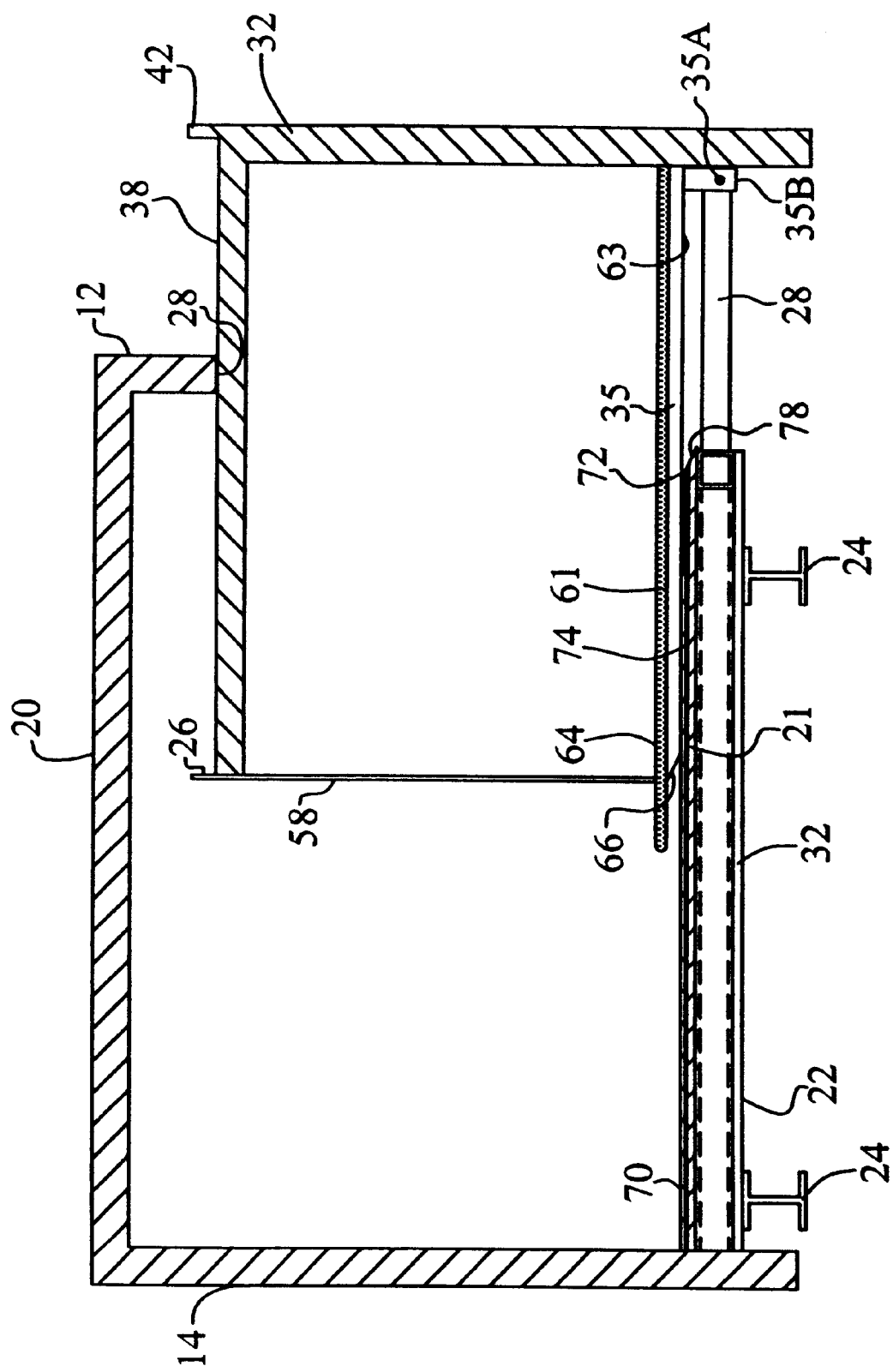
FIG. 4 is a view similar to FIG. 3A, illustrating the slide out room in an intermediate position between the retracted and the extended position.
Figure 5:
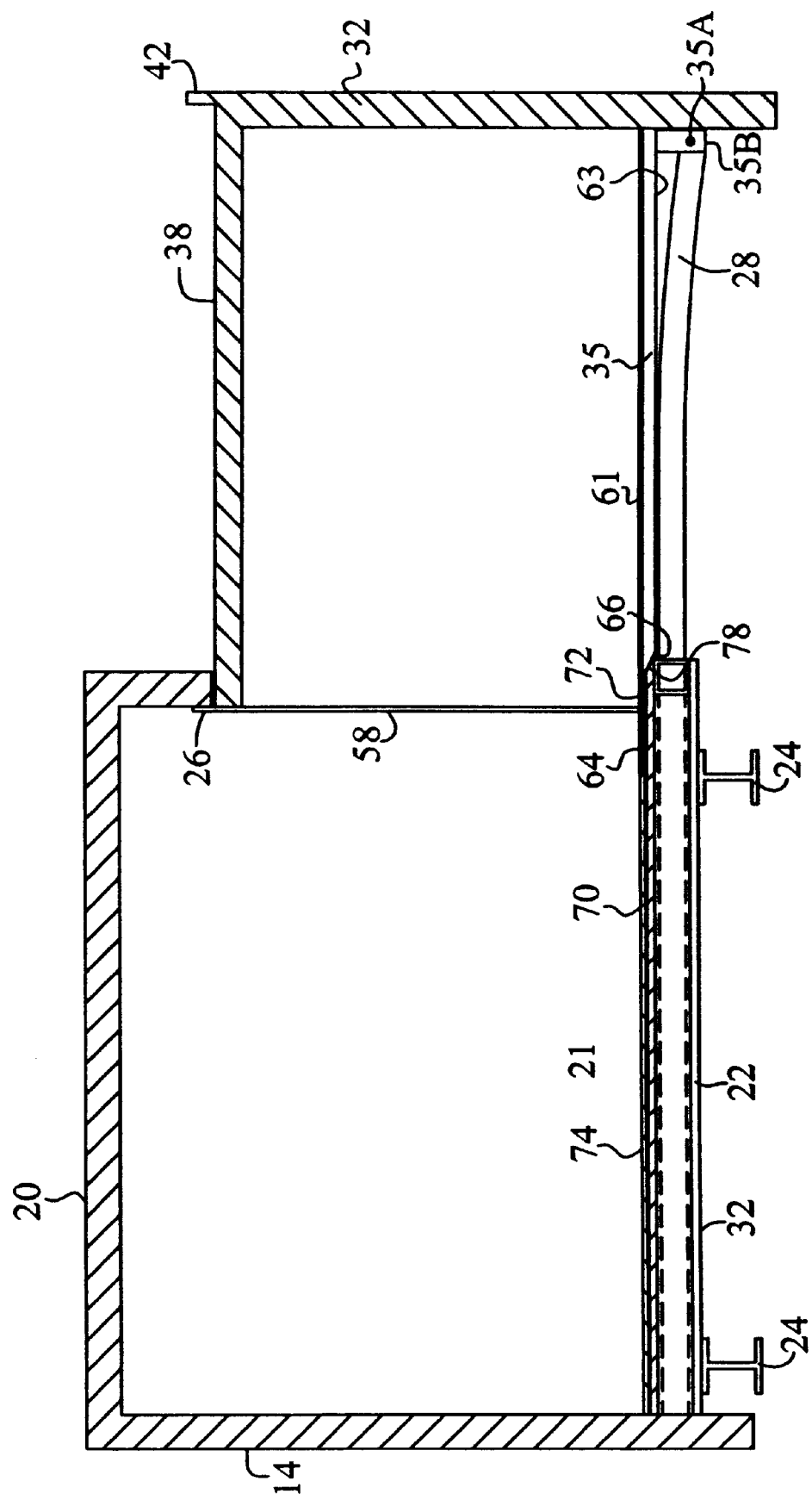
FIG. 5 is a view similar to FIG. 3A, illustrating the slide out room approaching the extended position.

Referring now to FIGS. 3A–5, floor 35 of slide out room 14 includes an upper surface 61 and a lower surface 63. Carpet 64 is secured to upper surface 61. A bevel 66 extending across the width of floor 35 slopes downwardly from upper surface 61 adjacent the end of floor 35 defining opening 58 at an angle, and intersects lower surface 63. A portion of carpet 64 extends beyond upper surface 61. When slide out room 14 is fully retracted as in FIG. 3A, lower surface 63 rests on carpet 70 which covers floor 20 of main living area 12. A wear bar 72 extends longitudinally along the edge of floor 20 defining opening 30. Padding 74, shown most clearly in FIG. 3B, is disposed between carpet 70 and the load-carrying layer 21 of floor 20. Padding 74 is cut short of wear bar 72 so that carpet 70 slopes downwardly as at 76 adjacent wear bar 72 to accommodate a flush fit when slide out room 14 is fully extended as in FIG. 5. Load-carrying layer 21 of floor 20 includes a ramp 78 at the end defining opening 30. Ramp 78 is configured to match bevel 66 on the underside of slide out room floor 35. Bevel 66 engages ramp 78 as slide out room 14 moves into the fully extended position as shown in FIG. 5. Bevel 66 and ramp 78 cooperate to raise slide out room 14 as it is retracted from the fully extended position.

As is well known to those skilled in the art, a cantilevered beam, which is represented by inner support 28 as slide out room 14 is moved to the fully extended position, deflects or bends as a function of the weight applied to the beam, the distance between the weight at the point at which the beam is supported, the thickness of the beam, and the type of material from which the beam is made. In FIG. 3A, with room 14 in the fully retracted position, almost all of the weight of room 14 is supported by floor 20 of main living area 12. A relatively small part of the weight of room 14 is supported by support member 28. Accordingly, support member 28 does not bend substantially.

Referring to FIG. 4, slide out room 14 has been extended an appreciable amount, but floor 35 of slide out room 14 still rests primarily upon floor 20. Although some of the weight has been transferred to inner support 28, a substantial portion is still supported by floor 20. Accordingly, inner support 28 deflects only slightly, since the weight applied to inner support 28 and the length of inner support 28 from outer support 32 is such that the deflection is minimized. In FIG. 5, however, the end of bevel 66 has moved past wear bar 72 and lower surface 63 of slide out room floor 35 rests on top of inner support 28 at its exit from outer support 32. Accordingly, a relatively high percentage of the weight of room 14 is now supported by inner support 28, and inner support 28 has been further extended from outer support 32, so that the bending or deflection is now substantial. It will be noted that the bending has increased substantially between the FIG. 4 and the FIG. 5 positions, just as bevel 66 has moved down over wear bar 72. The added bending of inner support 28 during movement of room 14 between the FIG. 4 and the FIG. 5 positions substantially matches the difference in height of floor 35 of room 14 and floor 20 of main living area 12 as bevel 66 passes over wear bar 72. Accordingly, floor 35 remains level despite the vertical movement of room 14. This occurs because the wall thickness and material of inner support 28 (as well as the number of inner supports) has been chosen to permit a deflection that is substantially equal to this vertical movement of slide out room 14.

Referring again to FIG. 5, with slide out room 14 in its fully extended position, it will be noted that inner support 28 has deflected such that it is not perpendicular to back wall 34. A pivot pin 35A may be used to accommodate this change in geometry, but is not required.

Figure 6:
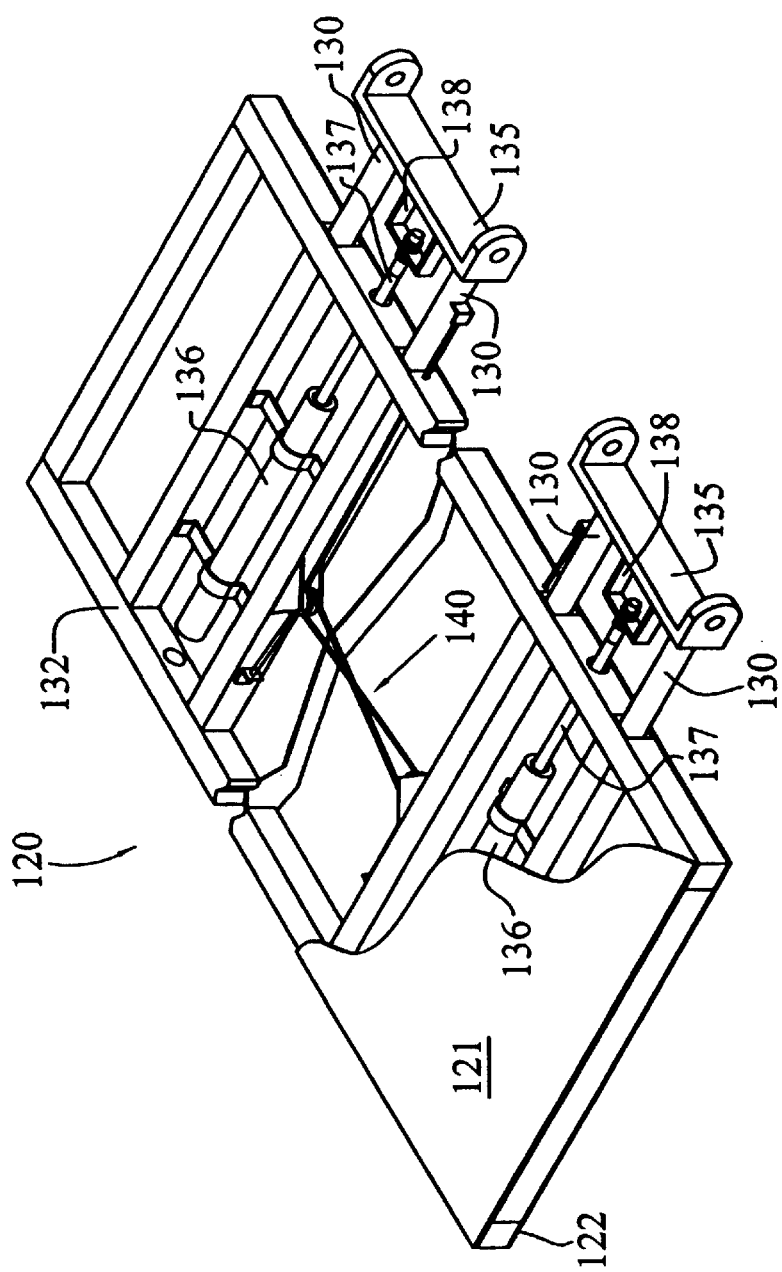
FIG. 6 is a top perspective view showing the structure of the main living area floor and extendable support members according to one embodiment of the present invention.

The construction of main living area floor 120 is shown in FIG. 6. Floor 120 has a framework of a number of square tubular channels or outer supports 132. Outer supports 132 may be, for example, 1.5 inches on each side and spaced about 16 inches apart, center to center. A relatively thin bottom or "skin" layer 122 of material, such as 0.25 inch masonite, is attached to the lower surfaces of outer supports 132. A top layer 121 of a material such as 0.625 inch particleboard can be applied to cover the upper surfaces of outer supports 132. A number of extendable support members or inner supports 128 are receivable within outer supports 132.

Figure 7:
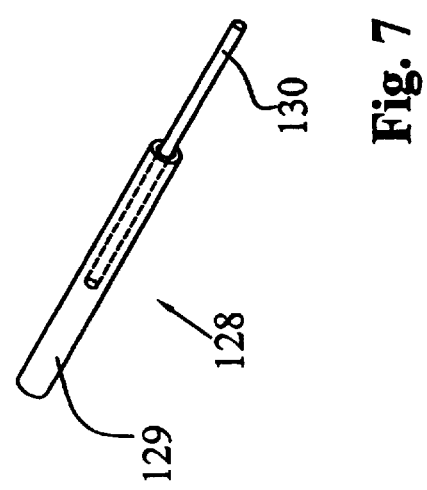
FIG. 7 is a top perspective view showing the structure of an extendable support member according to the present invention.

As shown in FIG. 7, each inner support 128 includes a round metal outer tube 129, preferably steel, having a 1.5 inch outside diameter and 0.125 inch wall thickness. Outer tube 129 is fixed within outer support 132. A solid inner bar 130, for example, 1.125 inches in diameter, telescopes inside outer tube 129. Inner bar 130 is also preferably made of steel. In a preferred embodiment, a minimum of four inner supports 128, are employed.

As depicted in FIG. 6, two adjacent inner supports 128 can be linked together by attachment ends 135 to work as a unit. Attachment ends 135 are secured to the lower portion of back wall 34 of slide out room 14 using suitable mounting brackets (not shown), many of which are known in the art. Preferably attachment end 135 includes a pivot pin to connect attachment end 135 to the mounting brackets to allow the back wall 34 to pivot relative to inner supports 128 as inner bars 130 bend. This allows the back wall 34 to remain vertical and prevents cocking or binding of slide out room 14 in opening 30. In FIG. 6, hydraulic cylinders 136 are attached to outer supports 132 between two adjacent inner supports 128 with hydraulic rams 137 attached to drive brackets 138, which are fixedly connected to attachment ends 135. One end of each hydraulic ram 137 is threaded and includes a pair of nuts for adjusting the extended and retracted positions of room 14 according to well-known principles in the art.

A cable synchronizing mechanism 140 may also be included to ensure that inner bars 130 move inwardly and outwardly relative to floor 120 at substantially the same rate. Examples of cable synchronizing mechanisms are shown in U.S. Pat. No. 5,295,430, filed Mar. 22, 1994, which is hereby expressly incorporated herein by reference. It should also be understood that each pair of inner supports may be mounted within an individual cartridge (instead of within channels 132) which is inserted into a cavity within floor 120 such that inner supports 128 extend from floor 120 in substantially the same way as shown in FIG. 6. Each pair of inner supports 128 may be driven by a corresponding hydraulic cylinder 136. The synchronization of movement of one pair of inner supports relative to the other pair of inner supports may be accomplished through use of a hydraulic synchronizer such as is disclosed in U.S. patent application Ser. No. 60/252,567 filed Nov. 22, 2000, which is hereby expressly incorporated herein by reference. It should be further understood that the pairs of inner supports 128 may be actuated using motors and gears which are synchronized electronically according to the principles and devises disclosed in U.S. patent application Ser. No. 09/411,019 filed Oct. 1, 1999 which is also hereby expressly incorporated herein by reference. Other drive mechanisms are also available.

Figure 8:
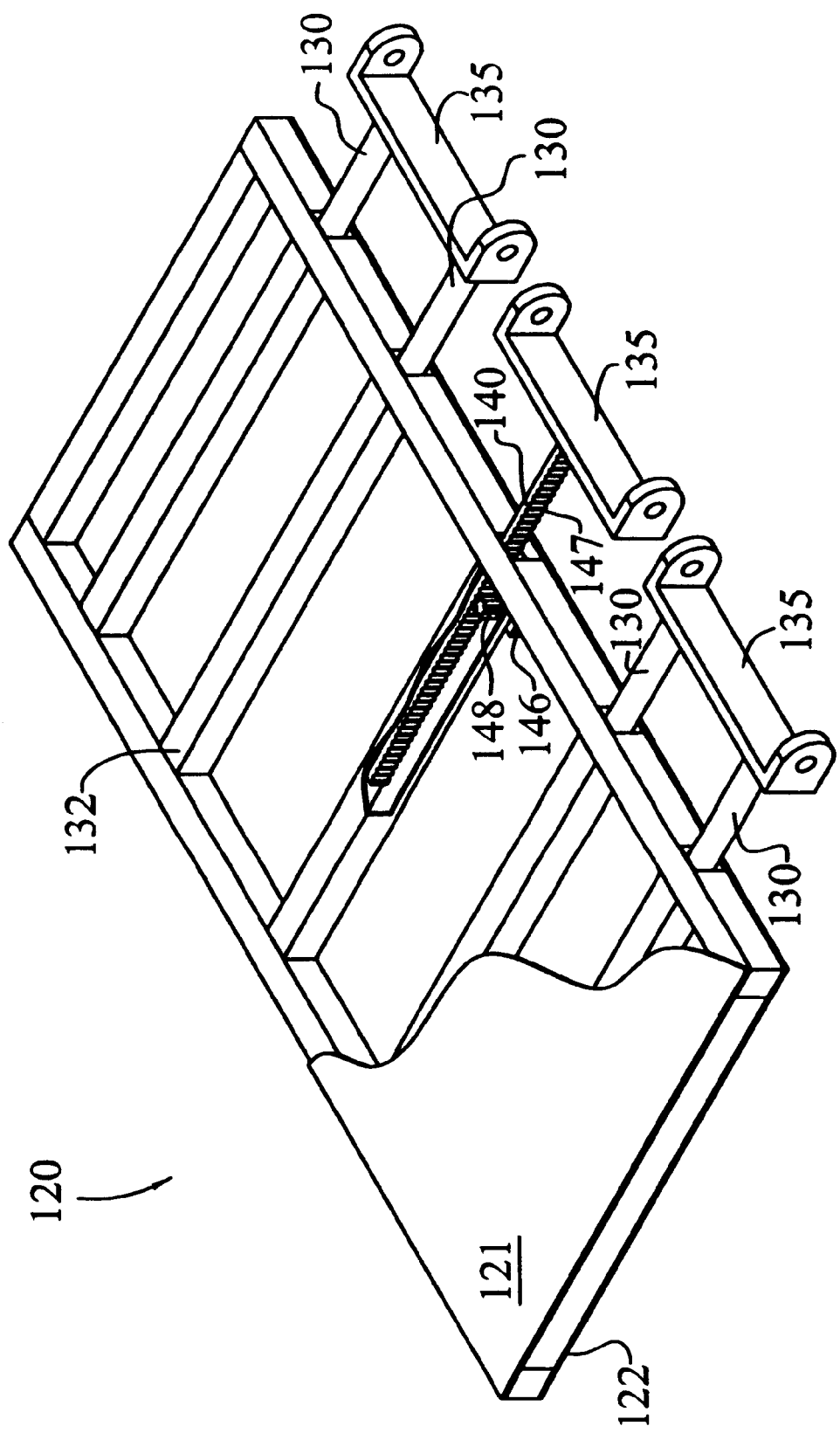
FIG. 8 is a top perspective view similar to FIG. 6, showing an alternate drive mechanism.

FIG. 8 shows an alternative drive approach. In this implementation, an additional support member 140 can be used as a driven member. Here, the drive mechanism includes a rack 147 attached to support member 140. Rack 147 engages a pinion gear 148, which is driven by a motor 146. While only one rack and pinion mechanism is shown in FIG. 8, it should be understood that multiple units may be required depending upon the size and weight of the slide out room being deployed. The rack and pinion drive mechanism of FIG. 8 could also be substituted for the hydraulic drive mechanisms of FIG. 6.

Figure 9:
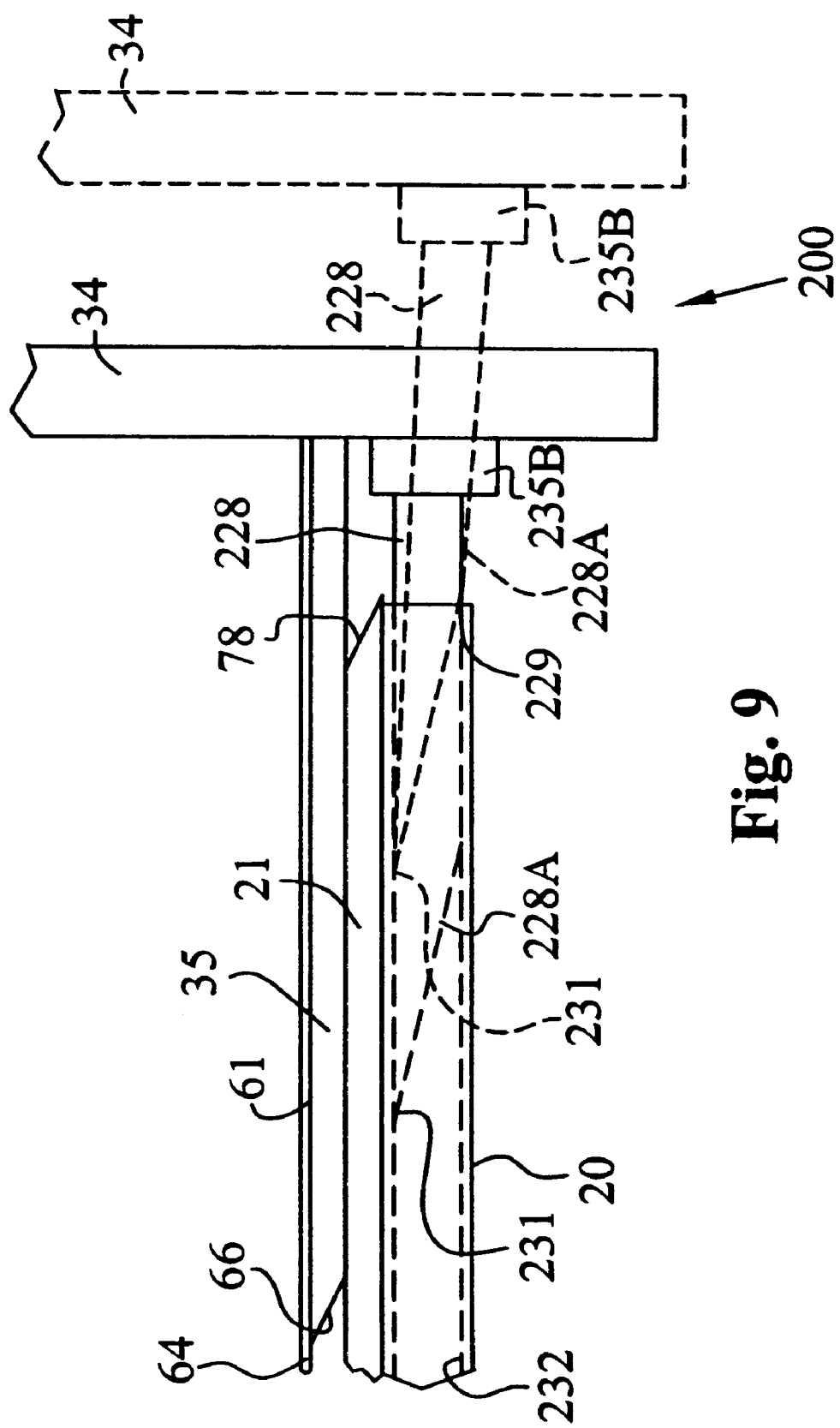
FIG. 9 is a partially fragmented, side elevational view of another embodiment of an extendable support mechanism according to the present invention.

Referring now to FIG. 9, another embodiment of an extendable support mechanism is shown. As shown, support mechanism 200 includes an outer support 232 formed within vehicle floor 20, and an inner support 228. Obviously, multiple outer supports 232 and inner supports 228 may be used. Inner support 228 includes a lower angled surface 228A as shown. When in the fully retracted position (as shown in solid lines in FIG. 9), a relatively small portion of inner support 228 extends coaxially from outer support 232.

As room 14 is moved toward the extended position (shown in dashed lines in FIG. 9), the weight of room 14 urges inner support 228 downwardly. Slight downward movement is permitted by angled surface 228A. As shown, angled surface 228A moves along edge 229 of outer support 232, while end 231 of inner support 228 moves along the upper surface of outer support 232. Accordingly, when room 14 is moved to the fully extended position, the incline of angled surface 228A provides a vertical drop, positioning slide out room floor 35 flush with main floor 20. It should be understood that this vertical drop may be provided by a combination of the shape of inner support 228 and bending or deflection of inner support 228 as described above. It should further be understood that a roller or wear pad (not shown) may be provided adjacent edge 229 of outer support 232 to facilitate movement of inner support 228 into and out of outer support 232.

Figure 10:
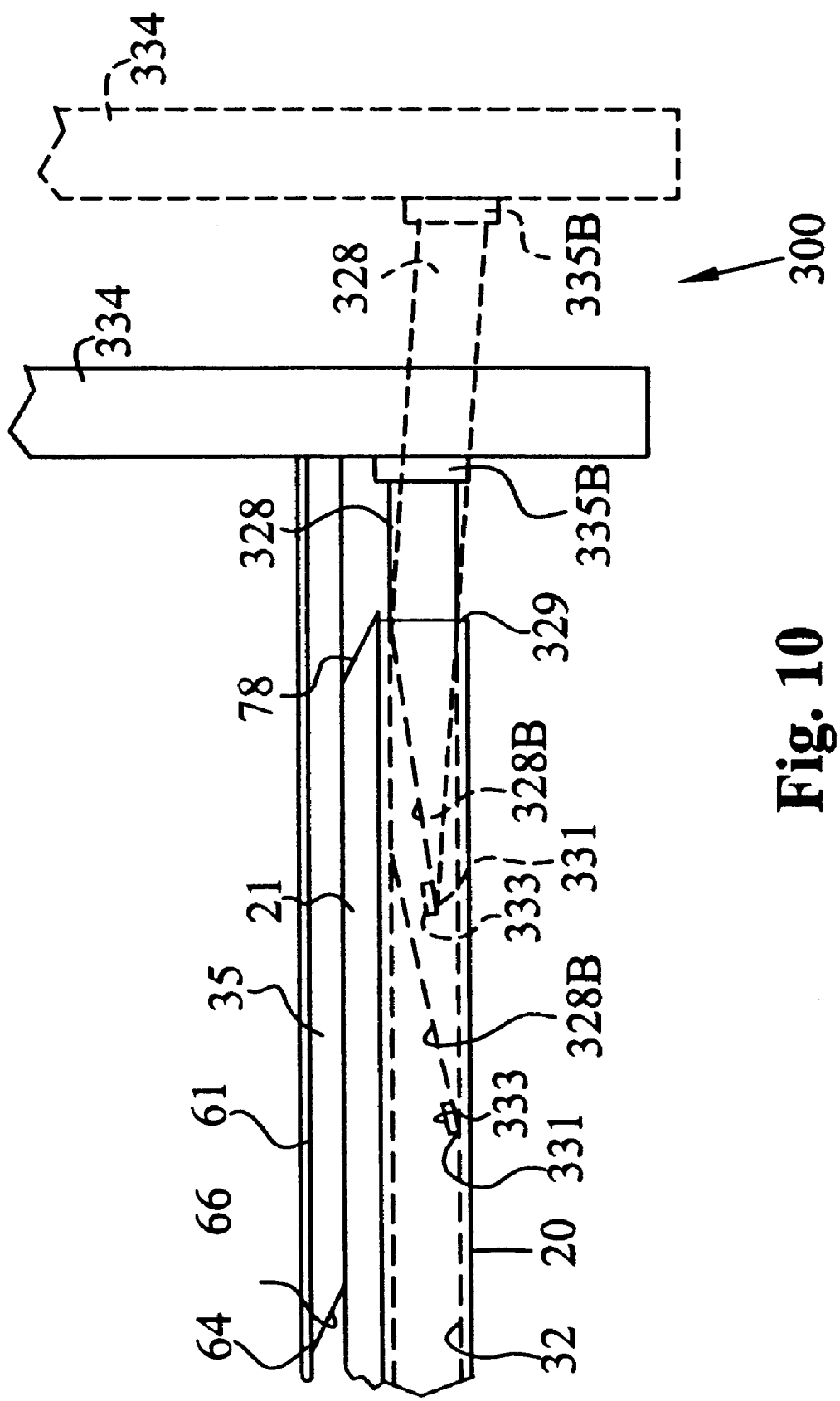
FIG. 10 is a partially fragmented, side elevational view of another embodiment of an extendable support mechanism according to the present invention.

FIG. 10 shows another embodiment of an extendable support mechanism according to the present invention. Support mechanism 300 is similar to support mechanism 200. Accordingly, the reference designations of like components have been retained, but increased by 100. Instead of a lower angled surface 228A, inner support 328 of extendable support mechanism 300 includes an upper, angled surface 328B. A wear pad 333 (or roller) is attached adjacent end 331 of inner support 328. Wear pad 333 may be made of polyethylene or some similar material.

As room 14 is moved to a partially extended position (as shown in dashed lines in FIG. 10), inner support 328 pivots slightly about edge 329 of outer support 332. This pivoting motion is permitted by the tapered shape or decreased thickness of inner support 328 adjacent end 331 (i.e., by angled surface 328B). As room 14 is extended to the fully extended position, wear pad 333 moves along the upper surface of outer support 332 and inner support 328 drops vertically further still, positioning the floor (not shown) of room 14 flush with floor 20. Of course, the downward movement of room 14 could result from a combination of the shape of inner support 328 and bending or deflecting of inner support 328.

Figure 11:
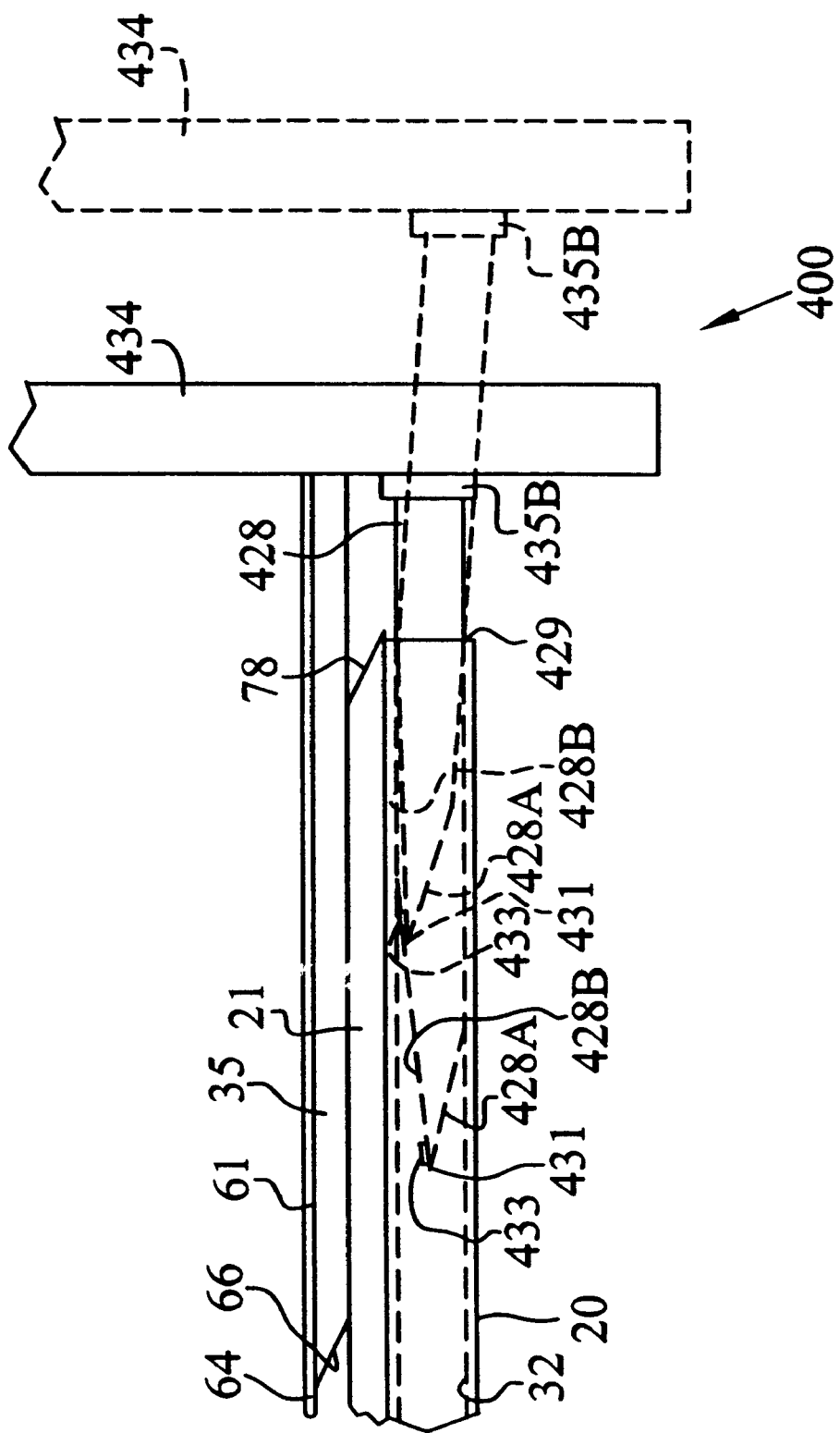
FIG. 11 is a partially fragmented, side elevational view of another embodiment of an extendable support mechanism according to the present invention.

FIG. 11 shows extendable support mechanism 400, which includes a lower angled surface 428A (similar to surface 228A of FIG. 9) and an upper angled surface 428B (similar to surface 328B of FIG. 10). As should be apparent from the foregoing, as room 14 is extended, room 14 moves vertically downwardly as lower angled surface 428A moves along edge 429 of outer support 432 and end 431 pivots upwardly toward the upper surface of outer support 432 (permitted by upper angled surface 428B). When room 14 is fully extended, support mechanism 400 positions room floor 35 flush with main floor 20 as a result of the shape of inner support 428, the deflection of inner support 428, or a combination of both. It should be understood that a wear pad or roller may be provided adjacent edge 429 of outer support 432 across which lower angled surface 428A may move.

Figure 12:
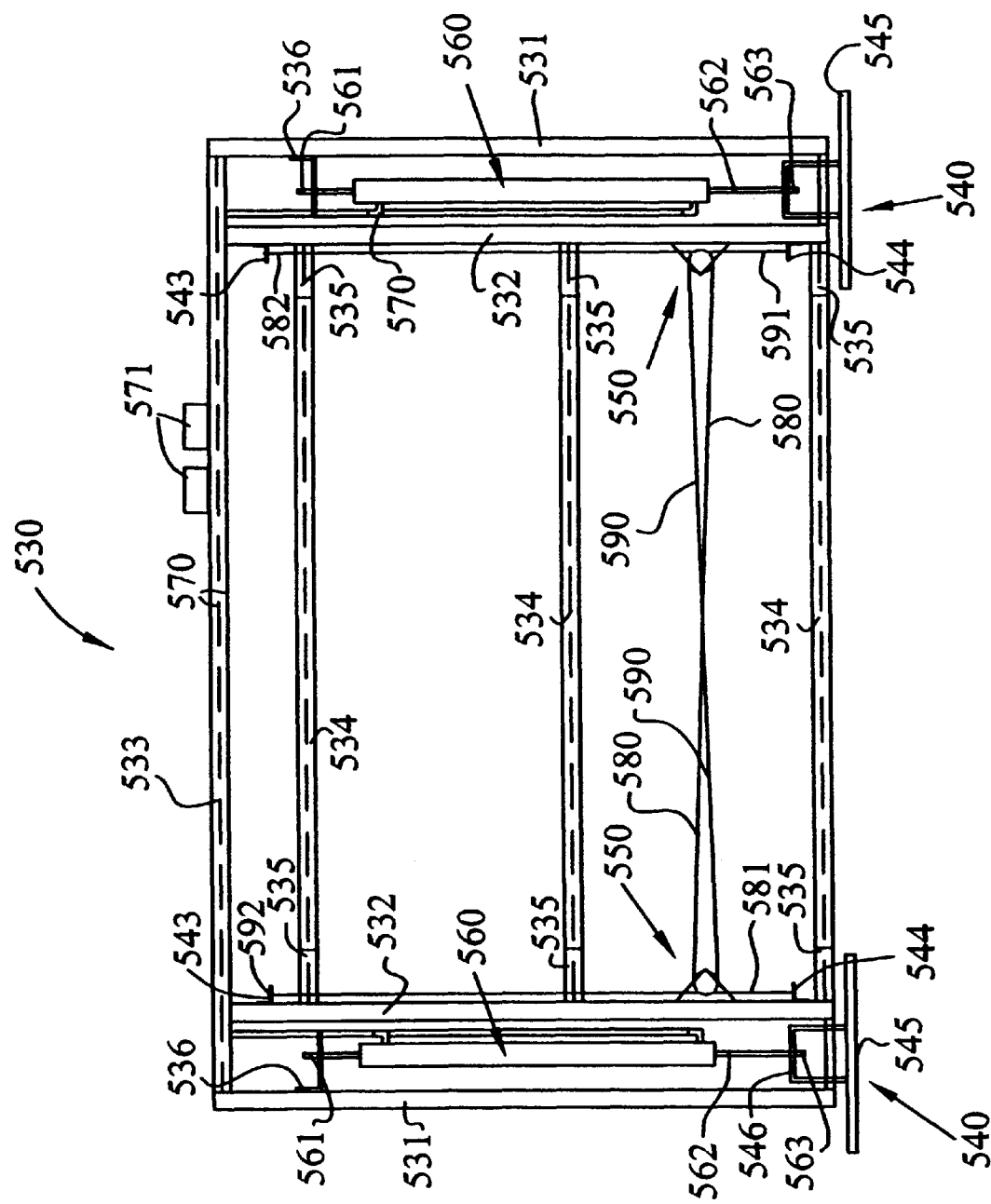
FIG. 12 is a top plan view of an extendable support mechanism for a recreational vehicle in the retracted position according to another embodiment of the present invention.

With reference now to FIG. 12, another embodiment of actuation mechanism will now be described. As will be apparent, actuation mechanism 530 is a modular pre-built unit designed for "drop-in" installation within main room floor, as more fully described herein. Actuation mechanism 530 (FIG. 12) generally includes outer guides 531, inner guides 532, rear frame member 533, cross frame members 534, slide assemblies 540, pulley assemblies 550, cylinders 560, hydraulics 570, a first cable 580 and a second cable 590.

Outer guides 531 are, in the embodiment shown, tubes having a generally square cross section. Inner guides 532 are, in the embodiment shown, c-channels having the open sides or slots thereof facing inwardly towards each other. Rear frame member 533 and cross frame members 534 are, in the embodiment shown, tubes of generally square cross section. Outer guides 531, inner guides 532, rear frame member 533 and cross frame members 534 may be made of materials such as steel or aluminum. Outer guides 531, inner guides 532, rear frame member 533 and cross frame members 534 may be joined as shown in FIG. 2 by bolting, welding or other means. Cross frame members 534 each include a clearance slot or cut out 535 to accommodate movement of slide out room 20. A bracket 536 is attached to each outer guide 531 to support cylinders 560.

Figure 13:
FIG. 13 is a partially exploded, top plan view of a slide tube assembly that forms a component of the extendable support mechanism shown in FIG. 12.

Slide assemblies 540 (FIGS. 12 and 13) generally include an outer slide member 541, an inner slide member 542, a first bracket 543, a second bracket 544, a third bracket 545 and a fourth bracket 546. First bracket 543 and second bracket 544 are connected to inner slide member 542 by bolts, welding or other means. In the embodiment shown in FIG. 13, bolts 543a are used. Outer slide member 541 and inner slide member 542 are joined to third bracket 545 as shown by welding, bolting or other means. Fourth bracket 546 is secured to third bracket 545 by welding, bolting or other means. Outer slide member 541 and inner slide member 542 are preferably solid steel members, however other materials may also be used.

Pulley assemblies 550 (FIGS. 12 and 15–17) generally include a first bracket 551, a second bracket 552, a third bracket 553, a pulley 554, a pair of bushings 555, a hub or axle 556 and a pair of spacers or bearings 557. First bracket 551 and second bracket 552 are connected to inner guide 532 as shown. Third bracket 553 is connected to second bracket 552 by bolts 558. Bushings 555 are secured between first bracket 551 and third bracket 553 by bolts 559. Bushings 555 help guide cables 580 and 590 and prevent cables 580 and 590 from disengaging pulleys 554. Axle 556 extends through pulley 554 and spacers 557 and, along with pulley 554 and spacers 557, is located between first bracket 551 and third bracket 553. Pulley 554 has a pair of grooves 554a for receiving cables 580, 590. Note that a pair of single groove pulleys could be used in place of double grooved pulleys.

Figure 14:
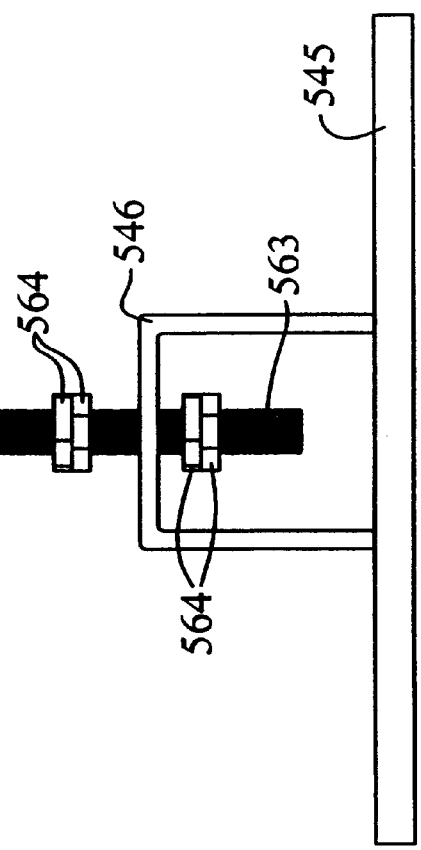
FIG. 14 is a top plan view illustrating the manner in which pistons that are a component of the extendable support mechanism shown if FIG. 12 are connected to the slide out room.
Figure 20:
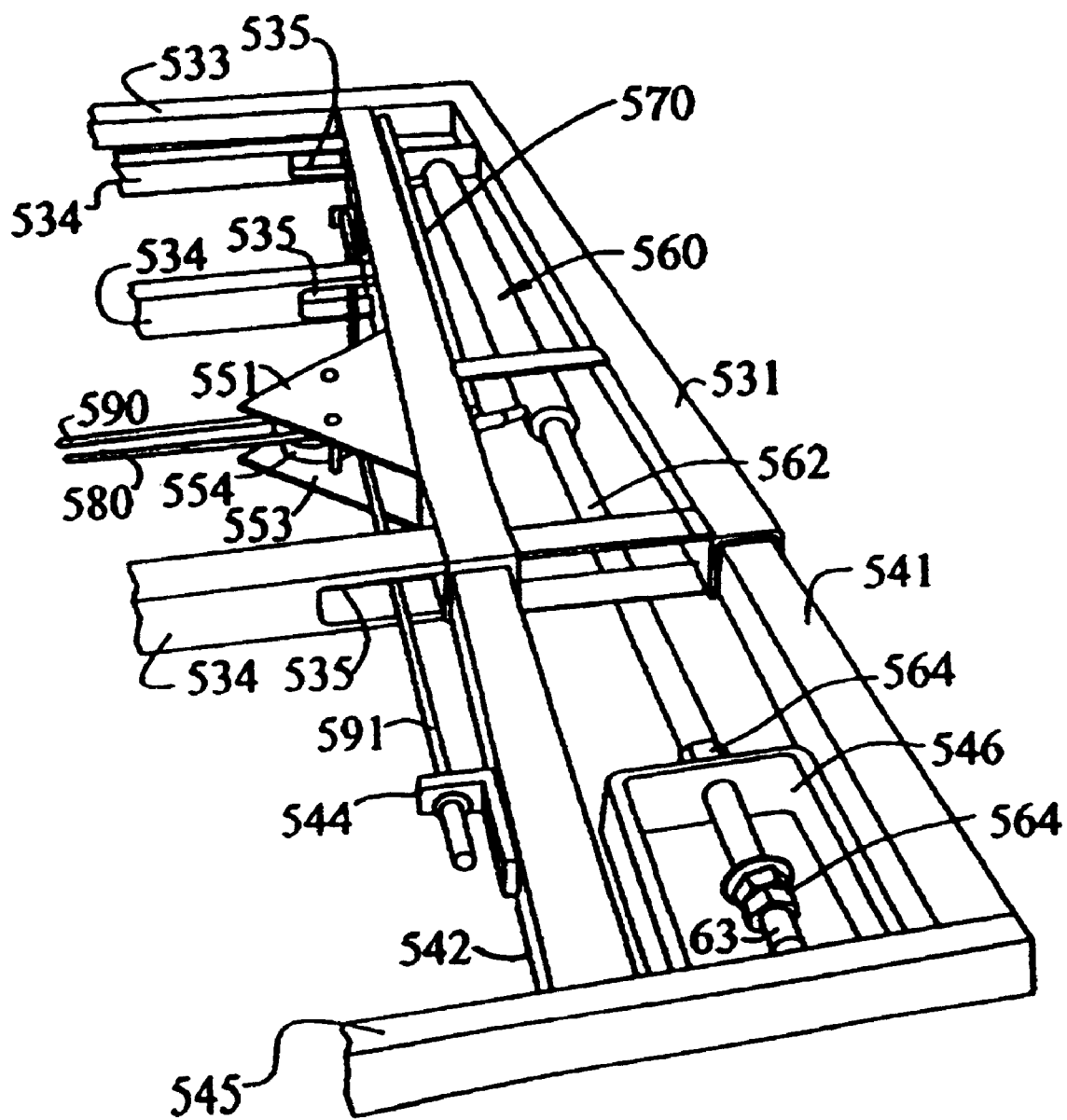
FIG. 20 shows an enlarged, partially fragmented, view of the extendable support mechanism according to the FIG. 12 embodiment.

As shown in FIGS. 12, 20, cylinders 560 are dual chamber cylinders having a first end 561, a piston 562, and a second end 563. First end 561 is secured to bracket 536 between outer guides 531 and inner guides 532. Second end 563 is threaded and extends through an opening (not shown) in bracket 546 (FIG. 14). Four nuts 564 are located on second end 563, two on each side of bracket 546. Nuts 564 prevent end 563 from becoming disengaged from bracket 546. Nuts 564 can be used to ensure a proper seal between slide out room 20 and main living area 511, as described below. Note that a single cylinder 560 of sufficient power could be used instead of two cylinders 560. If a single cylinder 560 is used, it is preferably positioned between inner guides 532. Hydraulics 570 operate cylinders 560 to extend and retract slide out room 20. Hydraulics 570 are preferably metal tubes and extend between cylinders 560 within rear frame member 533.

Figure 21:
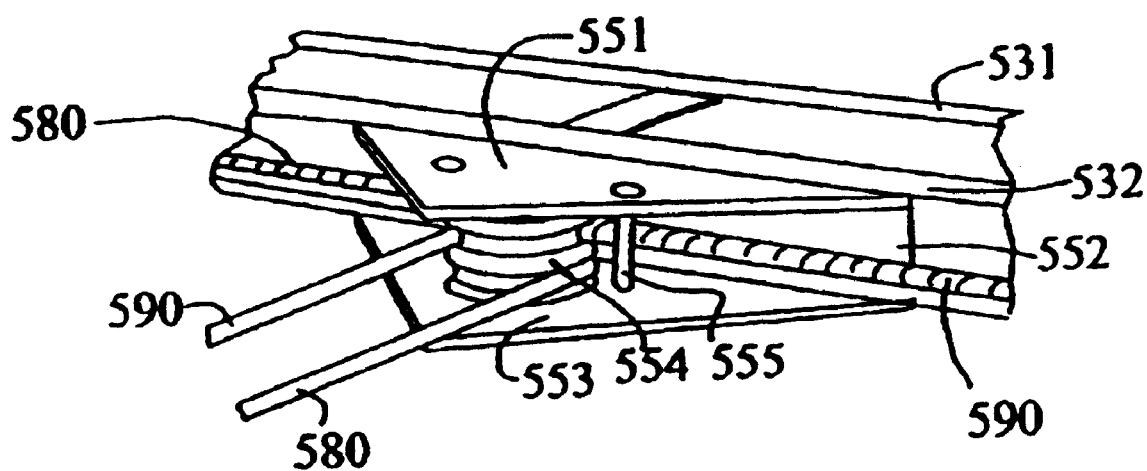
FIG. 21 shows an enlarged view of the double pulley mechanism used in the extendable support mechanism.

First end 581 of cable 580 and first end 591 of cable 590 are connected to opposite brackets 544. Similarly, second end 582 of cable 580 and second end 592 of cable 590 are connected to opposite brackets 543. Cables 580 and 590 extend around pulleys 554 in separate grooves 554a, as shown best in FIG. 21. FIG. 18 shows the manner in which first end 581 of cable 580 is secured to bracket 544. End 581 is connected to a threaded member 583 by a hex clamp 584. Threaded member 583 extends through bracket 544 and is prevented from disengaging by nuts 585. The tension in cable 580 may be adjusted by adjusting nuts 585 to draw threaded member 583, and cable 580 with it, in and out of bracket 544. Second end 592 of cable 590 is connected to its bracket 543 in the same manner.

Figure 19:
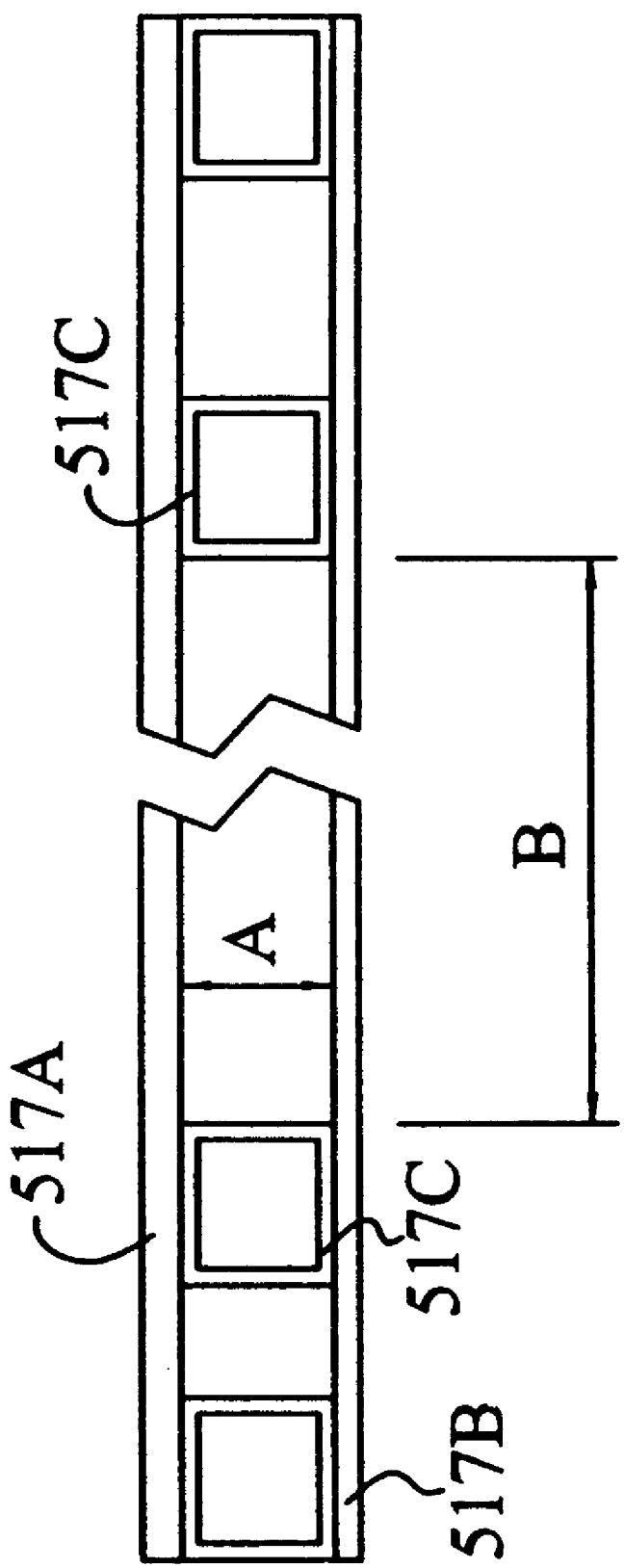
FIG. 19 is a partially fragmented side, elevational view of the floor structure of a vehicle.

Synchronizing mechanism 530 is as mentioned above, a unitary structure designed to be located within floor 517 of recreational vehicle 510. FIG. 19 illustrates the manner in which synchronizing mechanism 530 may be located within floor 517 according to one embodiment of the present invention. Floor 517 includes decking 517a, which is typically covered with carpeting, linoleum or other floor covering, and lower decking 517b. A plurality of floor support members 517c are located between decking 517a and 517b. The space A between decking 517a and 517b is, in most cases, approximately 1 and ½ inches. Synchronizing mechanism 530 can be inserted as a unit into the space between decking 517a and 517b. The space can be formed by cutting away sections of floor supports 517c. Alternatively, the chassis manufacturer can leave an opening of length B in the floor supports 517c for synchronizing mechanism 530. Once synchronizing mechanism 530 is in place, it is welded or bolted to floor supports 517c.

Because of the small space between decking 517a and 517b, the size of the components that can be used for synchronizing mechanism 530 is limited. However, the components must be sufficiently strong to support slide out room 20. In the embodiment shown, this is accomplished by using (1) a pair of cylinders 560, (2) two solid outer slide members 541, (3) two solid inner slide members 542, and (4) a cable synchronization system, which is very low profile and, therefore, well-suited for this application. It should be understood, however, that a rack and pinion system could readily be adapted according to the teachings of the present invention. A single shaft carrying a pair of gears could extend between the inner slide members 542 such that the gears mesh with racks mounted to the slide members. Alternatively, motors could drive separate rack and pinion drives for each side of the system, and be synchronized by a controller in a manner described in greater detail below. The pair of cylinders 560 provide the force needed to extend and retract room 520. Alternatively, a single, high pressure cylinder may be used. While cylinders 560 are shown mounted between inner and outer slide members 541, 542, the cylinders may be mounted in other locations and accomplish the same function.

Locating synchronizing mechanism 530 within floor 517 has several advantages. For example, synchronizing mechanism 530 is protected from damage as vehicle 510 is driven. Mechanism 530 is also protected from tampering or unintentional damage by the user of vehicle 510. As noted above, hydraulics 570 are preferably metal tubes and are located, to the extend possible, within rear frame member 533. This protects hydraulics 570 from damage, which can occur, for example, when screws are inserted through decking 517a to secure furniture, carpeting or other fixtures to decking 517a. A hydraulic connection can also be added to any of the rails, which connects to tubing 570, for example 571, as shown in FIG. 12. These fittings 571 are interconnected to the tubing 570, to provide a quick connection to the installer of the unit 530 into the main floor of the recreational vehicle.

In use, synchronizing mechanism 530 is assembled as shown in FIG. 12. Outer slide members 541 are positioned in outer guides 531 and inner slide members 542 are positioned in inner guides 532. Brackets 543 and 544 are positioned so as to extend through the slot or opening in inner guides 532. Brackets 546 are located between outer guides 531 and inner guides 532 and secured to second end 563 of cylinders 560. First end 561 of cylinder 560 is connected to bracket 536. Brackets 545 are connected to back wall 523 of slide out room 20.

To move slide out room 10B, cylinders 560 are operated to extend pistons 562, which in turn extend brackets 545 and slide out room 20 with it. Retracting pistons 562 retracts slide out room 10B. As slide out room 10B moves, outer slide members 541 and inner slide members 542 move within outer guides 531 and inner guides 532. As inner slide members 542 move, brackets 543 and 544 move as well. Slots or cut outs 535 provide clearance for brackets 543 and 544 and cables 580 and 590. Cables 580 and 590 synchronize movement of the front portion of slide out room 20 adjacent side wall 34 and the rear portion of slide out room 10B adjacent side wall 36. For example, if side wall 34 tries to move out faster than side wall 36, first end 581 of cable 580 will also attempt to move out more quickly than second end 582 of cable 580. This puts cable 580 under tension, transmitting a force to second end 582 of cable 580. Cable 580, therefore, pulls the bracket 543 to which second end 582 is attached outwardly at the same rate, thus synchronizing movement of slide out room 10B and preventing binding. The same principles apply to cable 590 and to retraction of slide out room 10A into vehicle 10.

Note that as pistons 562 are extended, end 563 moves outwardly until nuts 564 nearest to cylinder 560 engage bracket 546. Further extension of piston 562 pushes bracket 546 outwardly, thereby extending slide out room 10B. When pistons 562 are retracted, they move through bracket 546 until nuts 564 located within brackets 546 contact bracket 546. Further retraction of pistons 562 pulls brackets 546 inwardly, thereby retracting slide out room 10B. As is well known in the art, a flange or fascia typically surrounds a portion of slide out room 10B, such as inner flange 26 and outer flange 42, each of which have seals for sealing engagement against a respective inside or outside surface of side wall 12. When slide out room 10B is in its fully extended position, it is desirable to have this interior flange seal against an interior surface of main living area 10A. Similarly, when slide out room 10B is in its fully retracted position, it is desirable to have flange 26 seal against first side wall 12. Once slide out room 10B is in its fully extended or retracted position, the location of the interior flange 26 may be adjusted by adjusting nuts 564 to move slide out room 10B slightly inwardly or outwardly, thereby ensuring a proper seal.

Figure 22:
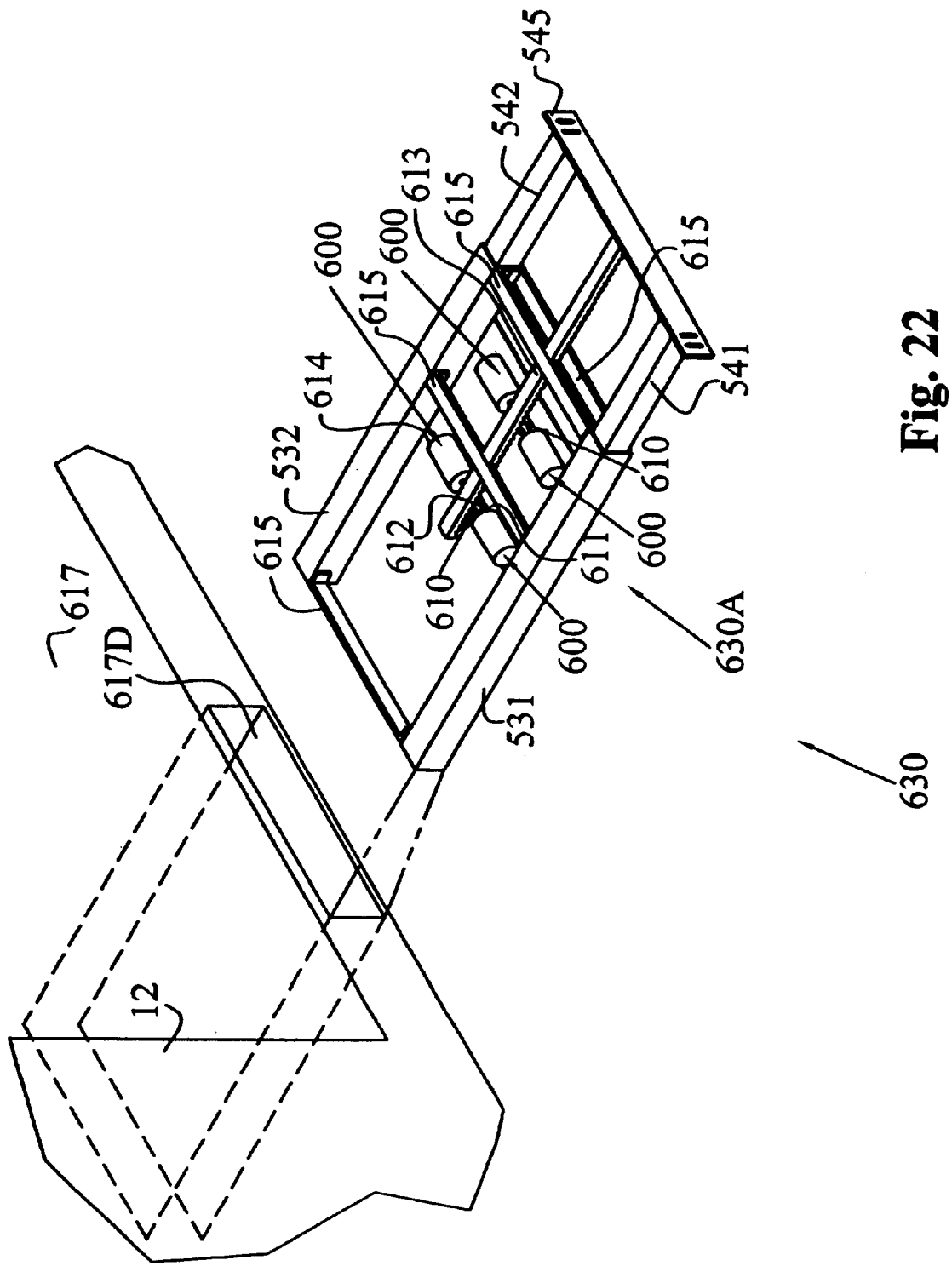
FIG. 22 is a fragmented, perspective view of an extendable support mechanism for a recreational vehicle slide out room according to another embodiment of the present invention.

FIG. 22 shows an alternative embodiment of a synchronizing mechanism 630 according to the present invention. In this embodiment, cylinders 560 and hydraulics 670 have been replaced with pairs of motors 600 and gear assemblies 610. Gear assemblies 610 can include any of a number of known components, such as a rack and pinion, bevel gears and/or worm gears. As shown, each pair of motor 600 is connected to a common shaft 611 which carries a pinion gear 612 for driving a rack 613. Rack 613 is connected at one end to bracket 545. Motors 600 are mounted on a plate 614. A plurality of straps 615 extend between guides 531, 532 to connect the guides and maintain rack 613 in contact with pinion gears 612. Motors 600 are operated by a controller that synchronizes their operation, thereby synchronizing movement of gear assemblies 610. This in turn synchronizes movement of slide out room 20. Note that because motors 600 are synchronized electronically, it is not necessary to tie together opposite sides (only one shown) of synchronizing mechanism 630, as was done for synchronizing mechanism 530 with cables 580 and 590. Thus, synchronizing mechanism 630 may be separated in to two separate assemblies 630a and 630b (not shown). Each of assemblies 630a and 630b may be inserted into a separate cavity 617d within floor 617, as shown.

Although the present invention has been shown and described in detail the same is for purposes of example only and is not intended to be a limitation on the invention. Numerous modifications to the present invention will be apparent to those of skill in the art.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. Transportable living quarters having a main living area and a slide out room assembly, said slide out room assembly being slidable relative to said main living area between a retracted position retracted within the main living area and an extended position extended from the main living area to provide an auxiliary living area, said slide out room having a floor which is slidably movable over a floor of said main living area during the slide out room extension, said main living area floor further comprising at least one channel which encloses therein an extendable support member which supports said slide out room between said extended and retracted positions, said extendable support member being deflectable in response to the weight transfer of said slide out room in the extended position, such that said main room floor and said slide out room floor are substantially flush when said slide out room is in the extended position.

2. Transportable living quarters as claimed in claim 1, wherein said extendable support member has a fixed portion fixed within said at least one channel and an extendable member slidable within said fixed portion, said extendable member having an end connected to said slide out room for supporting said slide out room as said slide out room moves between said retracted and extended positions.

3. Transportable living quarters as claimed in claim 2, wherein said main floor is defined by a load carrying layer and a lower layer, with a plurality of side by side braces extending therebetween, wherein said at least one channel is defined between at least two of said braces.

4. Transportable living quarters as claimed in claim 1, wherein an innermost end of said slide out room floor engages said extendable member, when in the extended position.

5. Transportable living quarters as claimed in claim 1, wherein said slide out room has an end wall and said extendable member is attached to said end wall.

6. Transportable living quarters as claimed in claim 5, wherein said extendable member includes an attachment end for attachment of said extendable member to said end wall.

7. Transportable living quarters as claimed in claim 6, wherein said attachment end includes a pivot pin for pivotable attachment of said extendable member to said end wall.

8. Transportable living quarters as claimed in claim 1, wherein said slide out room floor has an upper surface and a lower surface, said upper and lower surfaces defining a bevel at said innermost end of said slide out room floor.

9. Transportable living quarters as claimed in claim 8, wherein said load carrying layer has an upper surface and a lower surface, said upper and lower surfaces of said load carrying layer defining a ramp configured for engagement with said bevel of said side out room floor when said slide out room is in said extended position and whereby said bevel slides over said ramp to allow movement of said slide out room to said lowered position when said slide out room is in said extended position and moving said slide out room to said raised position when said slide out room is retracted from said extended position.

10. Transportable living quarters having a main living area and a slide out room assembly, said slide out room assembly being slidable relative to said main living area between a retracted position retracted within the main living area and an extended position extended from the main living area to provide an auxiliary living area, said slide out room having a floor which is slidably movable over a floor of said main living area during the slide out room extension, and a modular actuation mechanism comprised of a frame assembly having at least one extendable support member which supports said slide out room between said extended and retracted positions, said modular actuation mechanism being built into the main room floor.

11. Transportable living quarters of claim 10, wherein said at least one extendable support member is deflectable in response to the weight transfer of said slide out room in the extended position, such that said main room floor and said slide out room floor are substantially flush when said slide out room is in the extended position.

12. Transportable living quarters of claim 11, wherein said main living area floor comprises at least one channel, which encloses therein said modular actuation mechanism.

13. Transportable living quarters as claimed in claim 10, wherein said extendable support member has a fixed portion fixed within said at least one channel and an extendable member slidable within said fixed portion, said extendable member having an end connected to said slide out room for supporting said slide out room as said slide out room moves between said retracted and extended positions.

14. Transportable living quarters as claimed in claim 13, wherein said main floor is defined by a load carrying layer and a lower layer, with a plurality of side by side braces extending therebetween, wherein said at least one channel is defined between at least two of said braces.

15. Transportable living quarters as claimed in claim 10, wherein said main room floor is defined by an upper decking and lower decking, with a plurality of floor supports therebetween, defining said channel between said upper decking and lower decking and intermediate said plurality of poor supports.

16. Transportable living quarters as claimed in claim 15, wherein said frame assembly is comprised of front and rear frame members, side frame members and cross frame members, and said at least one actuation member is attached to said frame assembly.

17. Transportable living quarters as claimed in claim 16, wherein said modular actuation mechanism comprises two actuation members.

18. Transportable living quarters as claimed in claim 17, wherein said two synchronized to each other.

19. Transportable living quarters as claimed in claim 18, wherein said two actuation members are synchronized together by way of a cable synchronization mechanism ensuring synchronized travel of said two actuation members.

20. Transportable living quarters of claim 19, wherein said at least one extendable support member is deflectable in response to the weight transfer of said slide out room in the extended position, such that said main room floor and said slide out room floor are substantially flush when said slide out room is in the extended position.

* * * * *

UNITED STATES PATENT AND TRADEMARK OFFICE
CERTIFICATE OF CORRECTION

| | |
|---|---|
| PATENT NO. | : 6,637,794 B2 |
| APPLICATION NO. | : 09/995145 |
| DATED | : October 28, 2003 |
| INVENTOR(S) | : Patrick W. McManus et al. |

It is certified that error appears in the above-identified patent and that said Letters Patent is hereby corrected as shown below:

Column 12, Claim 15, Line 19, delete "poor" and insert -- floor --

Column 12, Claim 18, Line 30, between the words "two" and "synchronized" insert

-- actuation members are --

Signed and Sealed this

Twenty-second Day of August, 2006

JON W. DUDAS
*Director of the United States Patent and Trademark Office*